(No Model.)

M. COVEL.
SAW SWAGING DEVICE.

No. 342,188. Patented May 18, 1886.

Witnesses:
Frank Blanchard
L. M. Freeman

Inventor:
Milo Covel.
By L. B. Coupland & Co.
Attorneys.

UNITED STATES PATENT OFFICE.

MILO COVEL, OF CHICAGO, ILLINOIS.

SAW-SWAGING DEVICE.

SPECIFICATION forming part of Letters Patent No. 342,188, dated May 18, 1886.

Application filed September 29, 1885. Serial No. 178,515. (No model.)

*To all whom it may concern:*

Be it known that I, MILO COVEL, of Chicago, in the county of Cook and State of Illinois, have invented certain new and useful Improvements in Saw-Swages, of which the following is a full, clear, and exact description, that will enable others to make and use the same, reference being had to the accompanying drawings, forming a part of this specification.

This invention relates to improvements in saw-swages; and it consists of certain novel features in the construction, arrangement, and combination of the several parts, as will be hereinafter set forth.

Figure 1:
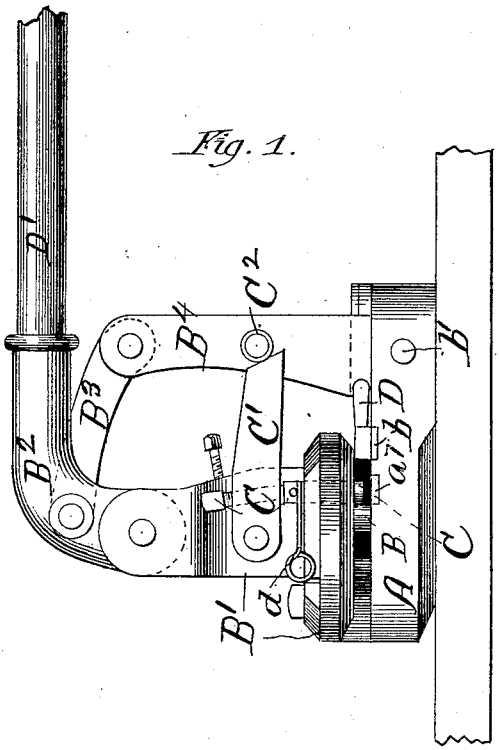
Figure 2:
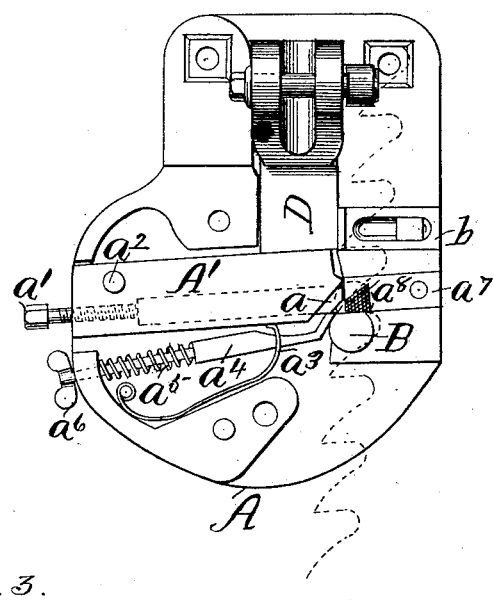
Figures 3, 4, 5:
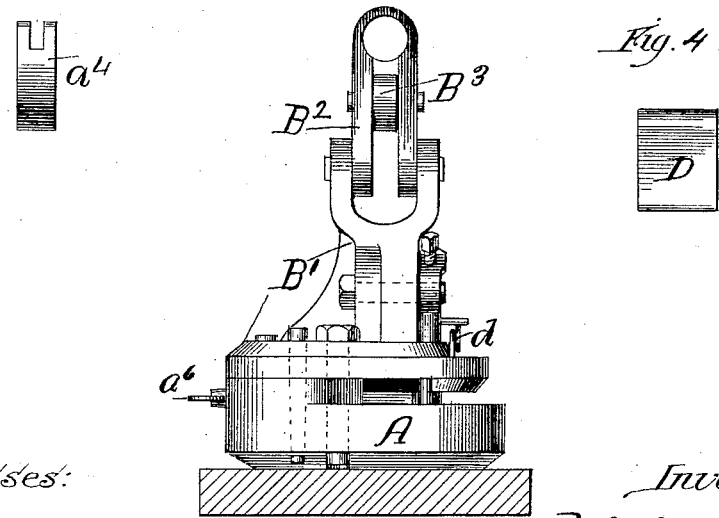

Figure 1 is a side elevation of a device embodying my improved features; Fig. 2, a plan view showing the interior works in the base, the upper parts being removed; Fig. 3, a front elevation; and Figs. 4 and 5 are detached details.

Referring to the drawings, A represents a base-block, the upper side of which is chambered or cut out to receive the several parts entering into the organization.

A' represents a movable die-block, recessed for the insertion of the adjustable die $a$, as shown in Fig. 2. The inner end of the die $a$, having contact with the teeth of the saw, projects a little beyond the die-block, as shown, and is longitudinally adjustable by means of the screw $a'$. The inner end of the die-block A' is adapted to have a slight movement on the pivot $a^2$, which movement carries the die-block and movable die away from the saw and the stationary die B, the position of the saw being indicated by the dotted lines in Fig. 2. The spring $a^3$ serves to return the movable die to a normal position, so as to permit of the saw being fed forward another tooth. The inner end of this spring is cut out, as shown in Fig. 5, in order to pass on each side of the inner end of the guide $a^4$ and force the same back from contact with the saw-tooth at the same time with the movable die. The inner end of this guide is bent upward, as shown in Fig. 2, and is provided with the spring $a^5$, to automatically retain the same in contact with the stationary die B. The outer projecting end of this guide is threaded, and provided with the thumb-nut $a^6$, whereby said guide may be adjusted with reference to the rounded surface of the stationary die, so as to impart more or less hook or pitch to the teeth, as may be required.

$a^7$ is a detachable slide secured to the base, the inner end of which is provided with the serrated or roughened surface $a^8$, as shown in Fig. 2. The tooth being swaged rests upon this roughened surface, and is thereby prevented from slipping.

$b$ is an adjustable stop, having the inner end turned up a little to form a rest for the point of the tooth, and may be moved in or out, as different saws may require.

The bracket B' is bolted to the base-block, the right side being left open, as shown in Fig. 3, for the insertion of the saw. The upper end of this bracket is bifurcated to receive the lower end of the angular socket-piece $B^2$, which has a pivotal movement therein. The lower or inner end of the socket-piece $B^2$ is bifurcated to receive one end of the link $B^3$, pivoted therein, as shown in Fig. 3. The opposite end of the link $B^3$ is pivoted in the upper end of the post $B^4$. The lower end of this post is secured in the base-block by the pivot-bolt $b'$. The adjustable clamping-bolt C passes down through the lever-arm C' and the flange on the bracket B', the lower end being adapted to be brought into contact with and clamp the saw-plate at each stroke of the swaging mechanism. One end of the lever-arm C' is pivoted to the bracket B', while the opposite beveled end has a frictional contact with the roller $C^2$, attached to the post $B^4$, as shown in Fig. 2.

The wedge-block D (shown in Figs. 1, 2, and 4) is rounded at both ends, and is loosely inserted between the lower part of the post $B^4$ and the inner end of the die-block A', both of which are provided with semicircular grooves corresponding to the rounded ends of the wedge-block D.

Fig. 1 shows the device in a normal position, the operating-handle D', inserted in the socket-piece, being horizontal. Now, as the handle is moved to a vertical position the upper end of the post $B^4$ is drawn toward the bracket B' by reason of the connecting-link $B^3$. At the same time this movement forces the loose end of the lever-arm C' to pass under the roller $C^2$ and force the bolt C down to rigidly clamp the saw in position just before the movable die is brought in contact with the tooth by the same movement through the medium of the wedge-block D, interposed between the post B⁴ and the movable die-block. The spring $d$ serves to return the clamping-bolt C to its normal position after each stroke.

Having thus described my invention, what I claim as new, and desire to secure by Letters Patent, is—

1. In a saw-swage, the combination, with a movable die-block, of an adjustable die inserted therein, a stationary die or anvil, and the means described for bringing said movable die into position to swage the tooth, substantially as and for the purpose set forth.

2. In a saw-swage, the combination, with the movable die-block A' and the guide $a^4$, of the spring $a^5$, substantially as and for the purpose set forth.

3. In a saw-swage, the combination, with the stationary die or anvil B, having a rounded swaging-surface, of the adjustable guide $a^4$, having the inner end bent upward to conform to the contour of said die, the spring $a^5$, and the thumb-nut $a^6$, substantially as and for the purpose set forth.

MILO COVEL.

Witnesses:
L. M. FREEMAN,
U. STANWOOD.